Dec. 19, 1967     E. NEGRI     3,359,473
SELF-STARTING ELECTRONIC OSCILLATING DEVICE FOR CLOCKWORKS
Filed Feb. 25, 1965     2 Sheets-Sheet 1

Dec. 19, 1967  E. NEGRI  3,359,473
SELF-STARTING ELECTRONIC OSCILLATING DEVICE FOR CLOCKWORKS
Filed Feb. 25, 1965  2 Sheets-Sheet 2

United States Patent Office 3,359,473
Patented Dec. 19, 1967

3,359,473
SELF-STARTING ELECTRONIC OSCILLATING
DEVICE FOR CLOCKWORKS
Emilio Negri, Via Vanvitelli 41, Milan, Italy
Filed Feb. 25, 1965, Ser. No. 435,176
4 Claims. (Cl. 318—128)

ABSTRACT OF THE DISCLOSURE

A timekeeping and driving electromatic device including an electronic circuit of resistance-capacitance type having a natural frequency, a coil having a center-tap to form an exciting section and a driving section, a resistor and a capacitor connected to the exciting part, and a timekeeping oscillating member magnetically coupled to the circuit, the timekeeping member including a fly wheel having an interrupted rim, a portion of which penetrates the bore in the coil, a permanent magnet mounted on one end of the rim, first and second arms extending outwardly from the hub of the fly wheel, a magnetic shield on one end of said arm, a permanent magnet on one end of the interrupted rim, the magnet and shield forming an armature lying in the axis of said coil.

---

The present invention concerns electronic circuits, fed with direct current or rectified alternating current, apt to generate electric pulses to be used in combination with a permanent magnet, carried by a timing member of a clockwork, for instance a balance wheel provided with a spiral spring, or an elastic lamina, or carried by a rotating electromagnetic member.

There are already known electronic devices for timing the movement of clockworks. However, though capable of maintaining the oscillating movement of the timing member, they are unable to start it when same is initially at rest. Other known devices do actually succeed in spontaneously starting the movement, but to do so they have to operate with timing members of a type susceptible to vibrate at a very high frequency (in the order of hundreds of cycles per second) and with a very small amplitude, and are unable to cause the spontaneous starting with timing members of the balance wheel type, that oscillate at a frequency of a much smaller order of magnitude, and with much larger amplitude.

The need of realizing the self-starting characteristics is very important especially when the clockwork device is applied to bodies or casings of rather remarkable size and weight, such as radio apparatus, refrigerators, motorcars, motorboats, and more generally in all these instances requiring an additional mechanical device.

The electronic device according to the present invention eliminates such inconveniences, being apt to operate in combination with timing or rotating members for clockworks of the balance wheel type or the like, both maintaining the oscillations or the rotation once they have been started, and causing the self-starting when the balance wheel is at rest. Other advantages will become apparent from the following description.

The present device is characterized by the fact that it comprises a unidirectional power source, a semi-conductor device with three electrodes, namely a base, an emitter and a collector; a winding with an intermediate tap, destined to co-operate with a magnet carried by a timing member susceptible of oscillation or rotation, and a condenser, the power source being cut in with one pole connected to one of the condenser armatures through at least the collector-base resistance of the semi-conductor device, with its other pole connected to the other condenser armature through the entire windings, the first mentioned condenser armature being connected to the base, the intermediate tap being connected to the emitter, the winding section comprised between the end connected to the condenser and the intermediate tap constituting the exciting winding for the electronic device, in said exciting winding there being generated induced voltages due to the remaining section of the winding, constituting the driving winding, and the currents flowing through said driving winding being due to the periodic condition of the semiconductor device, thus generating a magnetic field apt to react mutually with the magnet carried by the timing or rotating device, so as to cause the self-starting and the steady oscillating condition or rotation of said timing or rotating member.

According to an additional characteristic of the present invention, between the base and the collector of the transistor there is connected a resistor of a suitable type, the resistance whereof is susceptible of changing with the temperature so that the overall resistance of the shunt arrangement, resulting from said resistance and that of the base-collector junction of the transistor, is practically constant. In this way, even when the ambient temperature does change and therefore varies the base collector resistance, tending to unfavourably modify the transistor polarization and therefore its operation, the described shunt arrangement, actually per se already known, allows to keep constant the polarization and therefore to keep the power consumption of the present electronic device at a low value, at any room condition.

In practice the circuit may be realized, in a nonlimiting form, as shown in the way of example in the attached drawing. More exactly:

Figure 1:
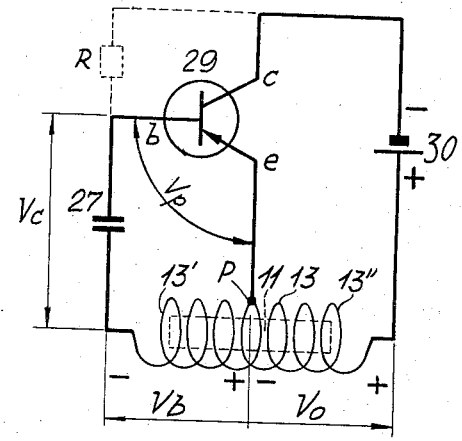
FIG. 1 is an electric diagram of the device.

In FIGURE 1, by 30 there is shown the current generator; by 29 a transistor, the base, collector and emitter electrodes whereof are respectively shown by $b$, $c$ and $e$; by 13 there is shown a coil divided in two sections 13' and 13'', respectively, the exciting and driving sections, by means of an intermediate tap P; 11 is a permanent magnet; 27 is a condenser; $V_c$ is the voltage across the condenser armatures; $V_p$ is the pilot voltage; $V_b$ is the exciting voltage, and $V_o$ is the driving voltage.

Figure 2:
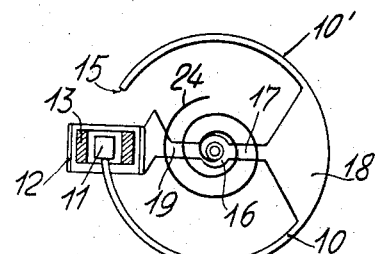
FIG. 2 represents a view of a balance wheel for clockworks, apt to operate in combination with the electric circuit shown in FIGURE 1.

In FIGURE 2, a flywheel 10 is made of a magnetic material and carries a small magnet 11 secured symmetrically relative to the center of a shielding ring 12; 24 is a spiral spring.

The coil 13 is the same as the one schematically shown in FIG. 1.

The flywheel 10 is interrupted in the point 15 for facilitating the assembling and disassembling of the electric parts from the mechanic parts. A hub or boss 16 is connected with the rim 10 by a sole arm 17 having at its outer end an enlargement 18 working as counterweight. A second arm 19, placed diametrally in relation to the arm 17 bears the shielding ring 12.

For sake of understanding, the operation of the present device will be examined first from the viewpoint of the self-starting feature, and then from the viewpoint of the normal running condition.

Figure 3:
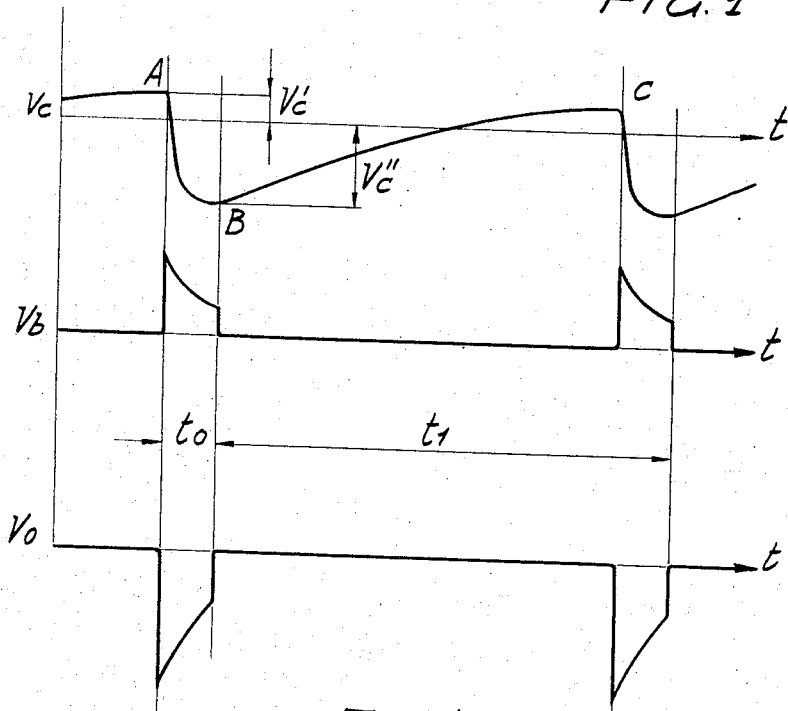
FIGURES 3, 4, 5 represent some voltage curves useful for understanding the operation of the circuit according to the invention.
Figure 4:
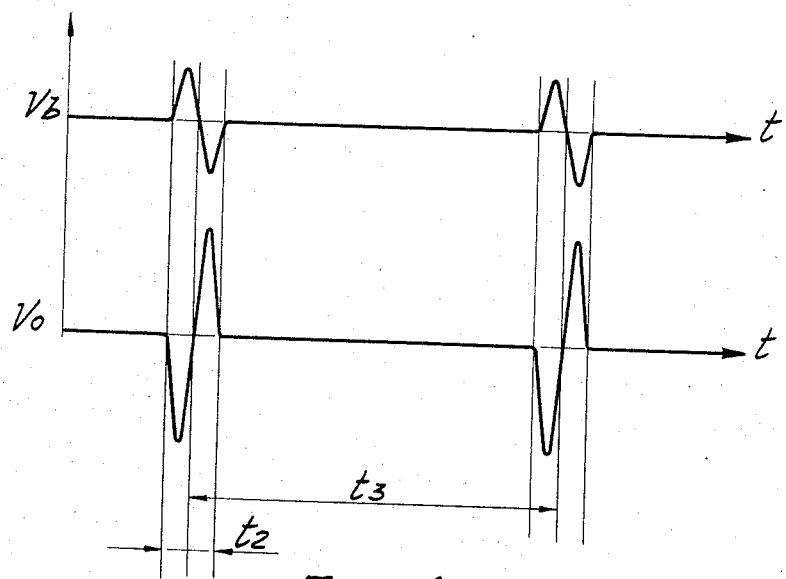
Figure 5:
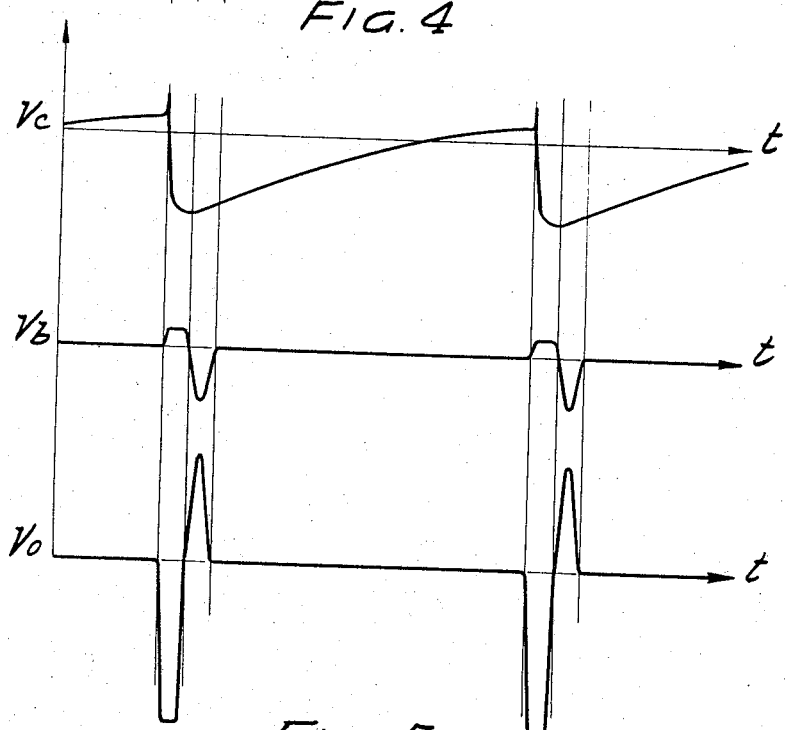

In FIGURES 3, 4 and 5, there are shown the voltage pulses (ordinate axis) that are being generated respectively in the condenser 27 ($V_c$), in the exciting section 13' of the coil 13 ($V_b$) and in the driving section 13'' ($V_o$); on the absissae axis there is shown the time $t$.

Initial behavior of the circuit according to FIGURE 1

Let us consider first the circuit alone, without the timing or driving member assembled, and with the cell disconnected, that is the voltages $V_c$, $V_b$, $V_o$ being zero. Upon cutting in the cell, at once a current $I_{cbo}$ starts to circulate, gradually charging through the base-collector junction (having a relatively high resistance) the condenser 27, with a negative polarity relative to the base $b$ and a positive one relative to the coil 13. The transistor is thus gradually polarized with a consequent flow, through the driving section (13″) of the coil, of a gradually increasing current $I_{ceo}$.

When the voltage $V_c$ across the condenser 27 reaches such a value as to bring the transistor gain past the knee of the gain curve ($V_c'$—FIGURE 3), the current flowing through the coil section 13″ increases remarkably in a very short time (FIGURE 3, point A). The current change in the coil section 13″ now considered causes by induction a voltage in the coil section 13′, the polarities whereof are arranged as shown in FIGURE 1, and the transistor becomes very quickly saturated and remains so (time $t_0$ in FIGURE 3), until the condenser allows a current to flow in the exciting circuit, becoming positively charged on its armature connected to the base $b$, and negatively on its armature connected to the coil, whereupon the transistor is cut off (instant B, with the condenser at a voltage $V''_c = V_b - V'_c$). Beginning from instant B, over the relatively high resistance of the base-collector junction, the condenser has the tendency to become charged in the reversed direction (branch B–C of the curve $V_c$ in FIGURE 3), because of the presence of the cell connected with its poles as shown in FIGURE 1. This imparts to the base a certain negative polarization, that in correspondence with point C reaches a value such as to cause the transistor to become conductive. There is thus repeated the cycle described above, causing a steady generation of pulses.

The voltage and current pulses that are being spontaneously generated in the electronic circuit in question are represented in FIGURE 3, and have their own period of duration $t_1$. It is now evident that if, in combination with such a circuit, acts a permanent magnet 11, carried by any whatever movable member (FIGURE 2), when the transistor is being saturated during the time $t_0$ (FIGURE 3), causing a maximum current flow in the driving section 13″ of the coil, the magnet receives a push and therefore is automatically caused to be set in motion.

Behavior of the circuit according to FIGURE 1 in the steady running conditions For ease of description, let us consider now the circuit according to FIGURE 1 coupled with a timing oscillating member according to FIGURE 2. Suppose the balance wheel is moving with a steady condition amplitude, and that the duration of oscillation of the balance wheel itself be $t_3 = 100$ milliseconds—FIGURES 4 and 5—corresponding to the time elapsing between two successive passages of the magnet 11 inside the coil 13 of FIGURE 2; the time during which the magnet 11 affects the coil has a duration $t_2 = 20$ milliseconds (FIGURES 4 and 5); the coil has its end terminals respectively cut off from the cell 30 and from the condenser 27 (FIGURE 1). Due to the quick passage of the magnet inside the coil there is generated therein an induced voltage $V = V_o + V_b$ (FIGURE 1) having an almost sinusoidal form, of duration $t_2$. By registering these voltage pulses with an oscillograph relative to the intermediate tap connected in "$e$" to the transistor 29—FIGURE 1—there are obtained the waveforms of FIGURE 4.

By combining now the own behavior of the circuit according to FIGURE 1 and the magnet effect on the coil 13 during the balance wheel oscillations according to the above description, it is evident that in order to obtain that the timing device according to FIGURE 2 be caused to control the circuit pulses, it is necessary that the own frequency $1/t_1$ of the circuit $f_1$, be slightly less than the own ocillation frequency $1/t_3$ of the oscillating member $f_2$, that is $t_3 < t_1$ and $$t_0 \geq \frac{t_2}{2}$$

If these conditions are satisfied, the circuit behavior becomes that of a controlled frequency pulse generator. The wave forms that are obtained are those shown in FIGURE 5. At the start, since the time $t_2$ is almost equal to $t_3$—FIGURE 4—inasmuch as the balance wheel covers a very small amplitude, the current flow has a remarkable duration, thus allowing a strong starting push.

It will be useful to note that in practical embodiments of the invention device, it was found expedient, by a suitable choice of the members dimensions, to cause the maximum voltage $V_b$ generated by the magnet to reach 0.4 volt, the condenser voltage apt to bring about the current flow through the transistor to reach 0.1 volt, so that the maximum reverse voltage of the condenser (point A on the curve $V_c$ in FIGURE 3) is:

$$V_c'' = V_b + V_c' = 0.4 + (-0.1) = 0.3$$

volt.

As already mentioned above, it was suitably arranged that to the time fraction of the 100 millisecond cycle of the balance wheel (time $t_3$ in FIGURE 4) there corresponds a pulse of about 8+10 milliseconds (time $t_2/2$ in FIGURE 5).

Under these conditions, the integrated consumption of the device under steady running conditions (there being intended as integrated consumption the sum of the consumption due to the true and proper balance wheel motion, considered present for 10 milliseconds, plus the rest current during the remaining 90 milliseconds) results of about 35 micro-amperes, such a value being very small.

During the short duration of maximum conduction conditions of the transistor, the current $I_{ce}$ reaches values of 700 microamperes.

During the initial time of self-starting there are reached values of 150+200 microamperes because, due to the still small amplitude of the isochronal oscillations, the time $t_2$ (FIGURE 4) becomes extended until it occupies almost all of the 100 millisecond cycle (the small magnet practically moves always inside the coil 13) whereby the large consumption occurs almost continuously. However, as stated above, the self-starting time has a very short duration.

To sum up, the consumption of the device according to the invention is remarkably reduced, and the features of the invention are such as to allow the self-starting of balance wheel types of clockworks. Further, it will be noted that to the good efficiency contributes the arrangement of the circuit components. In fact, since the exciting section 13′ of the coil 13 is constituted by few turns, inasmuch as the polarization is given by the condenser 27, there is a saving of wire, with the double advantage of being able to reserve a larger number of turns to the driving section 13′ of the coil (useful section) and to reduce the braking action generated by the current $I_B$.

The dependence of the transistor base-collector junction resistance from the temperature may be compensated by shunt connecting with said junction a resistor, indicated with R in FIGURE 1, of a type having a temperature variation factor of a sign opposite that of the junction. There is thus prevented the unfavourable effect that at high temperatures said junction, by changing remarkably its resistance, might have on the power consumption. By such an arrangement it is possible, as it is evident, to maintain the power consumption within reasonably constant limits.

What is claimed is:

1. A timekeeping and driving electromagnetic device for electrical clockworks, comprising an electronic circuit of the resistance-capacitance type having a natural frequency and including a transistor, a center-tapped coil of cylindrical configuration, said coil defining a longitudinal bore therein, said coil including a center-tap dividing the winding of said coil to form an exciting section and a driving section, a resistor and a capacitor connected in an exciting part of said circuit, and a timekeeping oscillating member electromagnetically coupled to said circuit; said timekeeping member including a balance wheel having a fly-wheel including an interrupted rim, a portion of which penetrates said bore in said coil, said fly-wheel including a hub, a single arm extending substantially radially outwardly of said hub, said rim being connected to said hub by said single arm, a permanent magnetic mounted on one end of said interrupted rim, a second arm connected to said hub and positioned diametrically opposite said first arm, a magnetic shield on a free end of said second arm, said magnetic and shield forming an armature of an electromagnetic lying in the axis of said coil.

2. Structure in accordance with claim 1, further characterized in the provision of power supply terminals electrically connected to the base of said transistor through the collector-base resistance of said transistor, and having in parallel therewith a resistor having a temperature coefficient opposed and counteracting that of the collector-base resistance of said transistor, whereby said device may be temperature compensated.

3. Structure in accordance with claim 1, in which the time constant produced in the electronic circuit by the resistance-capacitance components has a time duration significantly longer than the time duration of one half-oscillation of said timekeeping member, whereby said timekeeping member may control both frequency and duration of pulses induced in said coil, said pulse being amplified so as to be equal in number to the number of half-oscillations of said timekeeping member with a time duration constant for each pulse, said time duration being proportional to the angular speed of the timekeeping member during the conductive condition of said transistor.

4. Structure in accordance with claim 3, said transistor having a bias during the time interval between two adjacent induced pulses of a value sufficient to maintain said transistor in non-conducting state during said interval, and conductive under control of said timekeeping member.

References Cited
UNITED STATES PATENTS

| | | | |
|---|---|---|---|
| 2,831,114 | 4/1958 | Van Overbeek | 318—132 |
| 2,945,168 | 7/1960 | Steinke | 318—128 |
| 3,117,265 | 1/1964 | Favre | 318—132 |
| 3,277,394 | 10/1966 | Holt et al. | 331—116 |

MILTON O. HIRSHFIELD, *Primary Examiner.*

D. F. DUGGAN, *Assistant Examiner.*